Figure 1:
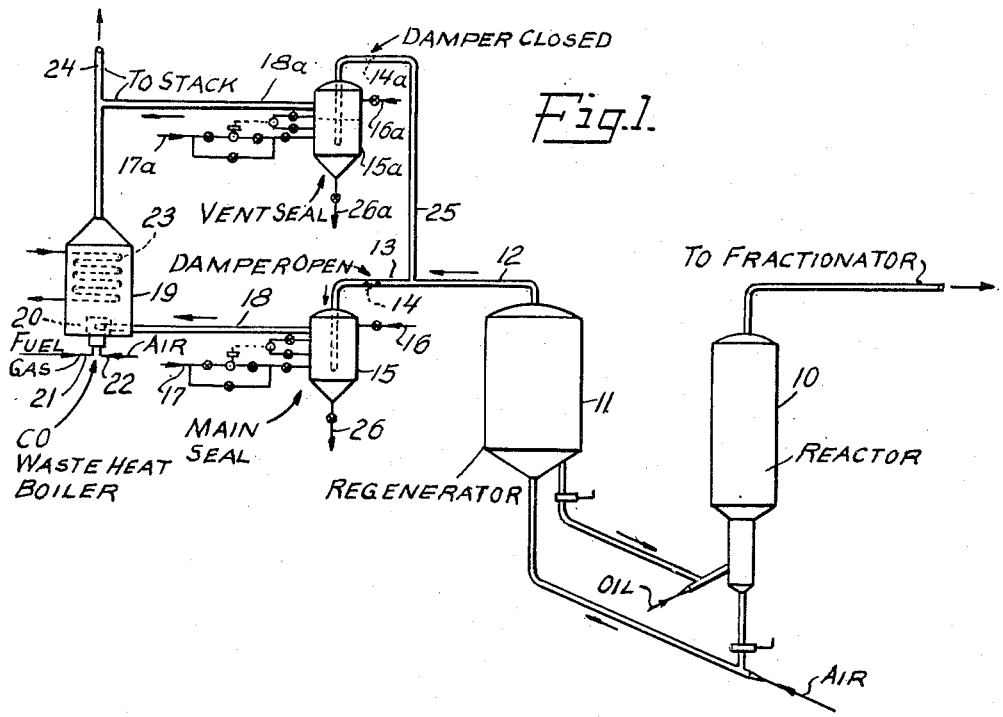

Jan. 15, 1957   O. F. CAMPBELL ET AL   2,777,428
APPARATUS
Filed April 1, 1953   2 Sheets-Sheet 1

INVENTORS
OLIVER F. CAMPBELL
WILLIAM H. DECKER
BY
Adams, Forward and McLean
ATTORNEYS

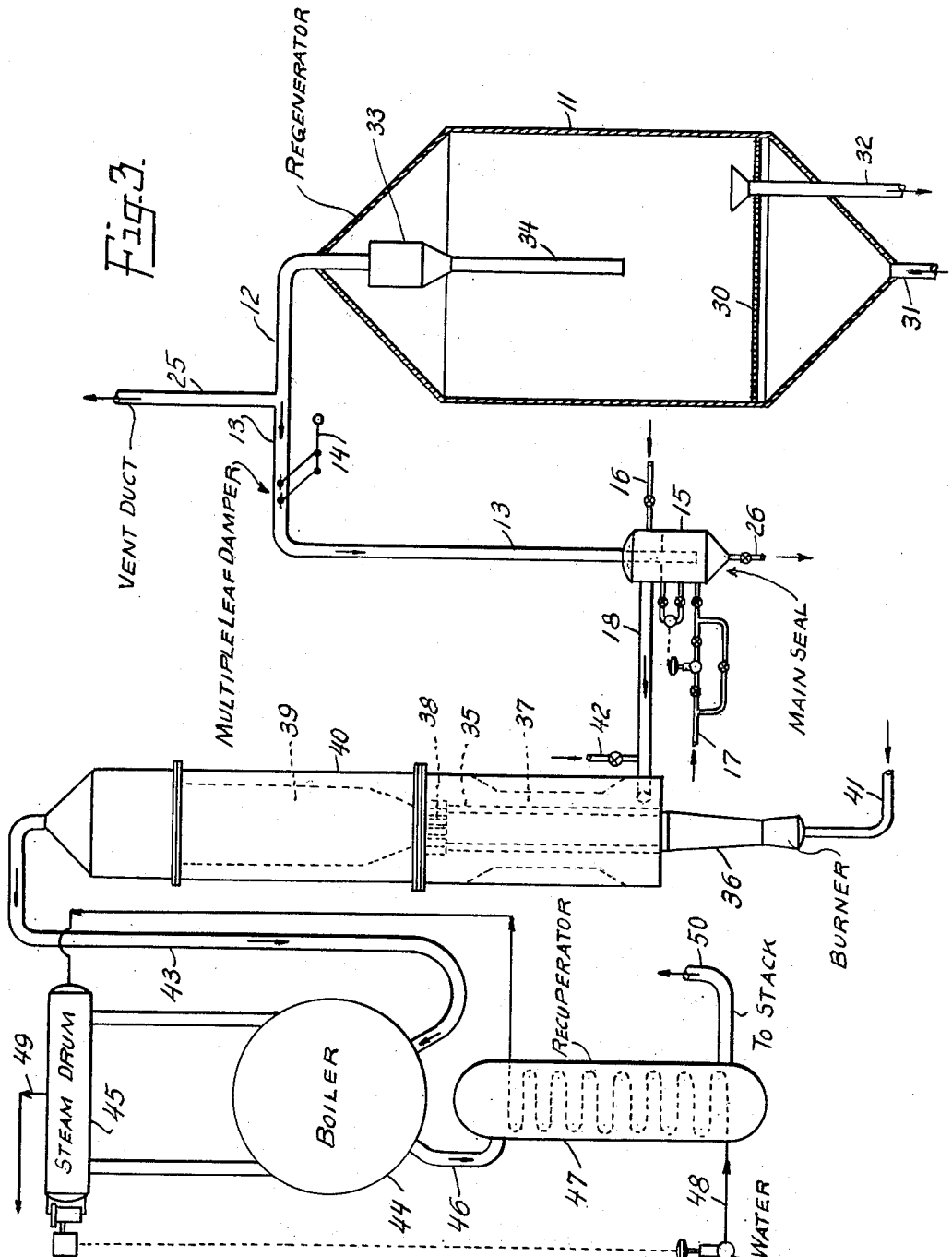

2,777,428
                                                                       Patented Jan. 15, 1957

2,777,428

APPARATUS

Oliver F. Campbell and William Harrison Decker, Whiting, Ind., assignors to Sinclair Refining Company, New York, N. Y., a corporation of Maine Application April 1, 1953, Serial No. 346,176

5 Claims. (Cl. 122—4)

Our invention relates to a waste heat recovery system for the recovery of heat from flue gases and, more particularly, from high temperature, high pressure and catalyst fines-containing flue gases produced in the regeneration of finely divided catalytic material in the fluid catalytic cracking of hydrocarbons. More specifically, our invention relates to an improved waste heat recovery system which provides means to isolate the waste heat recovery equipment from the source of the high temperature, high pressure and catalyst fines-containing flue gases in a simple and rapid manner that assures absolute and positive shut-off of the passage of flue gases to the waste heat recovery equipment. Our improved waste heat recovery system has particular value when it includes as waste heat recovery equipment a carbon monoxide waste heat boiler, i. e., a waste heat boiler which includes a carbon monoxide burner for converting into recoverable heat the thermal values of the carbon monoxide contained in the otherwise inert flue gases produced in the regenerator of a fluid catalytic cracking unit, because of the particular requirements of such waste heat recovery equipment with respect to isolation from the regenerator source of the high temperature, high pressure and catalyst fines-containing flue gases.

In the fluid catalytic cracking of hydrocarbons tremendous quantities of waste flue gases are produced in regenerating the spent catalyst discharged from the cracking zone. This regeneration operation is normally conducted at temperatures of about 1050° to 1250° F. in order to remove from the spent catalyst by combustion with an oxygen containing gas the coke deposit formed on the catalyst during the cracking operation. The waste flue gases leaving the regenerator are consequently at a high temperature of the order of 1000° to 1200° F. and are passed through waste heat recovery equipment to recover in the form of usable steam as much of the heat of these waste flue gases as possible in order to reduce the overall heat input requirements of the hydrocarbon cracking operation.

Fluid catalytic cracking units are commonly of such size as to be capable of processing 25,000 barrels per day of hydrocarbon feed stock and producing 9,000 to 10,000 barrels per day of gasoline. Because of the complexity of operation of these units, periodic shutdowns for repair and maintenance are carefully planned long in advance. Any unscheduled shutdown of the whole cracking unit because of equipment failure is extremely costly not only in the loss of production but also in attending maintenance and labor costs for the period of the shutdown. While waste heat recovery from regenerator flue gases is necessary in the operation of a fluid catalytic cracking unit to reduce the overall cost of the hydrocarbon cracking operation to a competitive level, it is not indispensable to the cracking operation, that is, the recovery of this waste heat is not technically necessary to the continued operation of the fluid catalytic cracking unit. Therefore, if a breakdown in waste heat recovery equipment occurs, it is a great deal less costly to continue the operation of the cracking unit with the consequent loss of flue gas heat until the waste heat recovery equipment can be put back into service than to shut down the whole cracking unit. Consequently, it is necessary to provide a means to divert the stream of flue gases away from a particular piece of waste heat recovery equipment or from all waste heat recovery equipment and vent the flue gases to the atmosphere to allow this equipment to be repaired or replaced. Whenever any repair work is required in waste heat recovery equipment, the exclusion of flue gases from this equipment must be complete and this requires that the equipment be isolated from the source of the flue gases. This is necessary because of the carbon monoxide content of the flue gases and the poisoning of workmen which would result if such precautions were not taken. The waste flue gases discharged from the regenerator in a fluid catalytic cracking unit contain carbon monoxide because of the controlled burning of the coke deposit from the spent catalyst that takes place in the regenerator. To control regeneration zone temperature and at the same time to provide maximum coke burning capacity based on the cubic feet of air or other regeneration gas available, regenerator burning of the coke deposit from the spent catalyst is controlled to avoid the complete combustion of coke to carbon dioxide and to maintain as low a ratio of carbon dioxide to carbon monoxide as is practical while insuring proper removal of coke from the catalyst.

The control of flow of flue gases to the waste heat recovery equipment and the isolation of this equipment from the source of the flue gases is complicated by the tremendous quantity of high temperature, high pressure and highly abrasive catalyst fines-containing flue gases discharged from the regenerator of the cracking unit. In commercial fluid catalytic cracking units as much as 150,000 S. C. F. M. or more of flue gases at about 1000° F. and 1.5 p. s. i. g. pressure are discharged from the regenerator and must be transferred to the waste heat recovery equipment This tremendous quantity of flue gases contains highly abrasive catalyst fines which are carried over from the catalyst mass in the regenerator. In view of these conditions, any system which will satisfactorily by-pass the stream of flue gases around the waste heat recovery equipment in such a manner as to effectively isolate the waste heat recovery equipment from the source of flue gases must be able to provide a leakproof seal so that no carbon monoxide bearing flue gases can leak by, and this seal must be effective against flue gases at a temperature of about 1000° F. and 1.5 p. s. i. g. pressure. In addition, such a system must be capable of withstanding the continuous passage of a stream of flue gases at a temperature of about 1000° F., at a rate of 150,000 S. C. F. M. or more and containing highly abrasive catalyst fines. The system must be of such a design that equipment operation is simple and rapid and at the same time provides an absolute and positive shut-off by a leakproof seal so that it is possible to isolate the waste heat recovery equipment from the source of flue gases without requiring shut-down or curtailment of operations of the entire fluid catalytic cracking unit.

It is of particular importance that the system provide a positive shut-off of the flue gases by a leakproof seal in order to completely isolate the waste heat recovery equipment from the regenerator. This requirement is of paramount importance from a safety standpoint to insure that no poisonous carbon monoxide can leak into the waste heat recovery equipment and thereby endanger the men working on such equipment, particularly when repair work is required on the inside or in closed areas of the equipment. Because of this requirement of a leakproof seal in a system normally handling a tremendous quantity of flue gases at high temperature and high pressure with the presence of highly abrasive catalyst fines in the flue gases, conventional flow control devices would not be satisfactory or effective and particularly those that depend on metal-to-metal contact to form the seal because of the erosion of such metal surfaces by the abrasive catalyst fines. Therefore, such devices as multiple leaf dampers, butterfly valves or roll curtain dampers would not be useful without an elaborate double arrangement with cold air bleeds between and such an arrangement would have a prohibitive initial cost and very high maintenance costs in a system in which the duct sizes for the flue gases would be in the range of 100 to 110 inches or more inside diameter.

Our waste heat recovery system is designed to provide a simple means for effecting an absolute and positive shut-off of the flow of high temperature, high pressure and catalyst fines-containing flue gases normally passing to the waste heat recovery equipment to isolate this equipment from the source of the flue gases. Our system includes a sealing arrangement which can effect a simple and rapid leakproof seal when the system is handling 150,000 S. C. F. M. or more of regenerator flue gases at about 1000° F. and 1.5 p. s. i. g. pressure, and such sealing arrangement is not subject to failure because of the erosive action of the appreciable quantity of extremely fine and highly abrasive catalyst dust which is carried over from the regenerator in the flue gases.

Our waste heat recovery system comprises a generating source of flue gases, e. g., the regenerator in a fluid catalytic cracking unit, and waste heat recovery equipment, e. g., a carbon monoxide waste heat boiler, which are joined by connecting ducts for the passage of the stream of flue gases from the source to the waste heat recovery equipment, a sealing arrangement in the connecting ducts, and a vent duct connected to the connecting ducts on the upstream side of the sealing arrangement with means to open and close the vent duct to the passage of the stream of flue gases. The sealing arrangment comprises a damper located in the connecting ducts and a water seal located in the connecting ducts on the downstream side of the damper. The water seal comprises a closed vessel through the top of which the connecting duct from the generating source of the flue gases passes and this duct for entering flue gases extends into the closed vessel to a point somewhat beyond the middle of the closed vessel, an outlet duct connected to the closed vessel near its top for flue gases passing through the vessel to the waste heat recovery equipment, an inlet line or lines for admitting water to the vessel and a drain line for discharging water from the vessel, each of the inlet and drain lines being provided with valve means to control rate of flow through these lines.

In normal operation of our waste heat recovery system when it serves as part of a fluid catalytic cracking unit, the regenerator and the waste heat boiler will be connected by the connecting ducts through the water seal vessel so that recovery of waste heat from the flue gases discharged from the regenerator can be effected in the waste heat boiler. During such normal operation the damper of the sealing arrangement will be open, the water seal vessel will be empty of water to allow unrestricted flow of the flue gases from the regenerator through the connecting ducts and the water seal vessel to the waste heat boiler, and the vent duct will be closed so that all flue gases from the regenerator pass through the waste heat recovery equipment. When it becomes necessary to isolate the waste heat boiler from the regenerator, the vent duct connected to the connecting ducts between regenerator and sealing arrangement is opened to allow the flue gases to be diverted to the stack, the damper of the sealing arrangement is closed and water is admitted to the water seal vessel through a water inlet line until the water level rises to close off the open end of the duct which extends into the water seal vessel and connects the regenerator and the water seal vessel and then rises to a level a sufficient distance above this open end to provide a sealing pressure sufficient to withstand the pressure of the flue gases and maintain a seal. This water level is maintained until the time when it is desired to re-establish flow of the flue gases between the regenerator and the waste heat boiler. As such time, the damper of the sealing arrangement is opened, the water inlet line to the water seal vessel is closed, the water seal vessel drain line is opened and when the water has drained out of the water seal vessel the vent duct which is connected to the connecting ducts upstream of the damper is closed so that flow of flue gases from the regenerator to the waste heat boiler is fully restored. The flow control device provided in the vent duct to open and close this duct to the passage of flue gases need not meet the rigid requirements of the sealing arrangement provided in the connecting ducts to isolate the waste heat boiler from the regenerator because it is not subjected to the passage of high temperature, high pressure and abrasive catalyst fines-containing flue gases for sustained periods and for the more important reason that it is not required to provide the completely leakproof seal required of the sealing arrangement. The vent duct may, however, be provided with advantage with a sealing arrangement the same as, or similar to, the sealing arrangement provided in the connecting ducts in order to prevent any leakage loss through the vent duct during normal operation of our waste heat recovery system.

While our waste heat recovery system may be embodied in various equipment arrangements, for example, the vent duct may divert flue gases either to the stack through which they would be discharged to the atmosphere or to an alternate waste heat boiler or a series of waste heat boilers, it has particular value when it includes a carbon monoxide waste heat boiler as waste heat recovery equipment. A carbon monoxide waste heat boiler recovers not only the heat of the flue gases leaving the regenerator but also the potential heat of these gases as represented by the thermal value of the carbon monoxide content of the otherwise inert flue gases. This thermal value may be as low as 5 to 15 B. t. u. per cubic foot, but because of the tremendous quantities of flue gases produced in the regeneration of catalyst in commercial cracking units, this represents an additional large quantity of recoverable heat. Recovery of this additional heat is accomplished by burning the carbon monoxide content of the flue gases in the carbon monoxide waste heat boiler. Heating of the regenerator flue gases to achieve burning of the carbon monoxide content may be accomplished by the continuous burning of an extraneous fuel and the mixing of the flue gases and the combustion products of such extraneous fuel in a specially designed carbon monoxide burner and waste heat boiler such as is described in our copending application Serial No. 235,183, filed July 5, 1951.

Our application Serial No. 235,183 describes a carbon monoxide waste heat boiler in which the burner comprises an elongated muffle tube combustion means for supplying to and burning in the muffle tube combustion chamber a fuel-air mixture, means forming an annular chamber surrounding the muffle tube combustion chamber, means for introducing the waste flue gases into the annular chamber in a portion of the chamber near the fuel-gas inlet of the muffle tube combustion chamber, a mixing register set in the end of the annular chamber communicating with the end portion of the muffle tube combustion chamber and separating the annular chamber from the lower combustion chamber, and an elongated furnace chamber of relatively enlarged section extending from the mixing register. Because the carbon monoxide waste heat boiler is a new piece of equipment, it will encounter now unforeseen operating problems which will necessitate periodic and emergency repairs as well as equipment adjustments. This, as well as any breakdown in waste heat recovery equipment, will require that the carbon monoxide waste heat boiler be taken off stream and isolated from the regenerator source of flue gases so that the atmosphere in the waste heat boiler may be made safe for mechanics. Our improved waste heat recovery system provides a simple and effective means for diverting all flue gases from the carbon monoxide waste heat boiler without the costly procedure of shutting down or curtailing the operations of the fluid catalytic cracking unit itself.

When used with any waste heat recovery equipment, our system provides a simple and rapid sealing arrangement which insures an absolute and positive shut-off of flue gases to the waste heat recovery equipment, whereas dampers or conventional valves have not been extensively developed from the high temperature, high pressure and high quantity conditions required in this type of system. In addition, such conventional flow control means depend on metal-to-metal contact for valve closures and so would be sufficiently eroded by the prolonged exposure to the flue gas stream containing appreciable quantities of abrasive catalyst fines to permit leaking of the poisonous carbon monoxide-containing flue gases into the waste heat recovery equipment, whereas our system provides a leak-proof seal the effectiveness of which cannot be damaged by the erosive action of the catalyst fines.

Our waste heat recovery system will be more completely described in connection with the accompanying drawings which are illustrative of our invention but not limiting, there being many possible embodiments of our invention. In the drawings Figure 1 is a diagrammatic illustration of one possible embodiment of our system, Figure 2 is a side view of the sealing arrangement of our system, and Figure 3 is a more detailed diagrammatic illustration of an embodiment of our system which includes a carbon monoxide waste heat boiler as waste heat recovery equipment.

In Figure 1 one possible embodiment of our waste heat recovery system is illustrated in normal operation. A fluid catalytic cracking unit is illustrated schematically by the reactor 10, regenerator 11 and the connecting lines for the introduction of an oil charge into the reactor 10 and the introduction of air into the regenerator 11 and the cycling of finely divided catalyst between the reactor 10 and the regenerator 11. Flue gases, produced in the regenerator 11 by the burning of the coke deposit from the spent catalyst passed to the regenerator 11 from the reactor 10, leave the regenerator 11 through flue gas duct 12 at a temperature of the order of 1000° F. In the normal operation of our waste heat recovery system, the flue gases from regenerator 11 pass through flue gas duct 12 into connecting flue gas duct 13 which is open because the main seal is not operating as a seal. The flue gases pass through flue gas duct 13 passing open damper 14 and into the water seal vessel 15 which is empty of water, water inlet lines 16 and 17 being closed. The hot flue gases pass out of the water seal vessel 15 through flue gas outlet duct 18 to waste heat recovery equipment such as the carbon monoxide waste heat boiler 19. In the carbon monoxide waste heat boiler 19, the flue gases are delivered to the combustion zone 20. Essentially, utilization of the flue gas carbon monoxide requires a furnace or burner system to heat the flue gases to about 1400° F. to burn the carbon monoxide. This heating can be accomplished by burning an extraneous fuel gas-air mixture and then mixing the combustion products with the flue gases. Fuel gas and air are introduced into the combustion zone 20 by lines 21 and 22. The use of extraneous fuel can be avoided by employing a catalyst, for example, by providing ceramic rods coated with a Pt-metallic compound complexcatalyst composition in the path of flue gas flow. The flue gases superheated by the carbon monoxide combustion reaction pass over steam generating tubes 23 and are discharged to the atmosphere through stack 24. During normal operation vent duct 25 is closed to the passage of flue gases by the vent seal. The vent seal is illustrated as formed by damper 14a which is closed and water seal vessel 15a in which a water level is maintained a sufficient distance above the open end of vent duct 25 extending into the water seal vessel 15a to provide a sufficient sealing pressure to maintain a seal against the pressure of the flue gases. This vent seal allows no flue gases to pass to stack 24 without passing through the waste heat boiler 19. When it is necessary to isolate waste heat boiler 19 from regenerator 11 to prevent carbon monoxide-containing flue gases from regenerator 11 from leaking into waste heat boiler 19 during the repair period, vent line 25 is opened to the passage of flue gases from regenerator 11 and flue gas inlet duct 13 is closed to the passage of flue gases from regenerator 11 by reversing the operation of the main seal and the vent seal. This is accomplished by opening damper 14a, closing water inlet lines 16a and 17a and opening the drain line 26a of the vent duct water seal vessel 15a. As the water drains out of the vent duct water seal vessel 15a, because of the lower pressure drop through the vent duct flue gas circuit as compared to the pressure drop through the normal flue gas circuit including waste heat boiler 19, the major flow of flue gases will pass from the regenerator 11 through line 12, vent duct 25, vent duct water seal vessel 15a and flue gas outlet duct 18a to stack 24 for discharge to the atmosphere. Waste heat boiler 19 is then isolated from the flue gas source, i. e., regenerator 11, by closing damper 14, opening water inlet lines 16 and 17 to establish and maintain a water level a sufficient distance above the open end of flue gas inlet duct 13 extending into water seal vessel 15 to withstand the pressure of the flue gases and maintain a seal.

Figure 2:
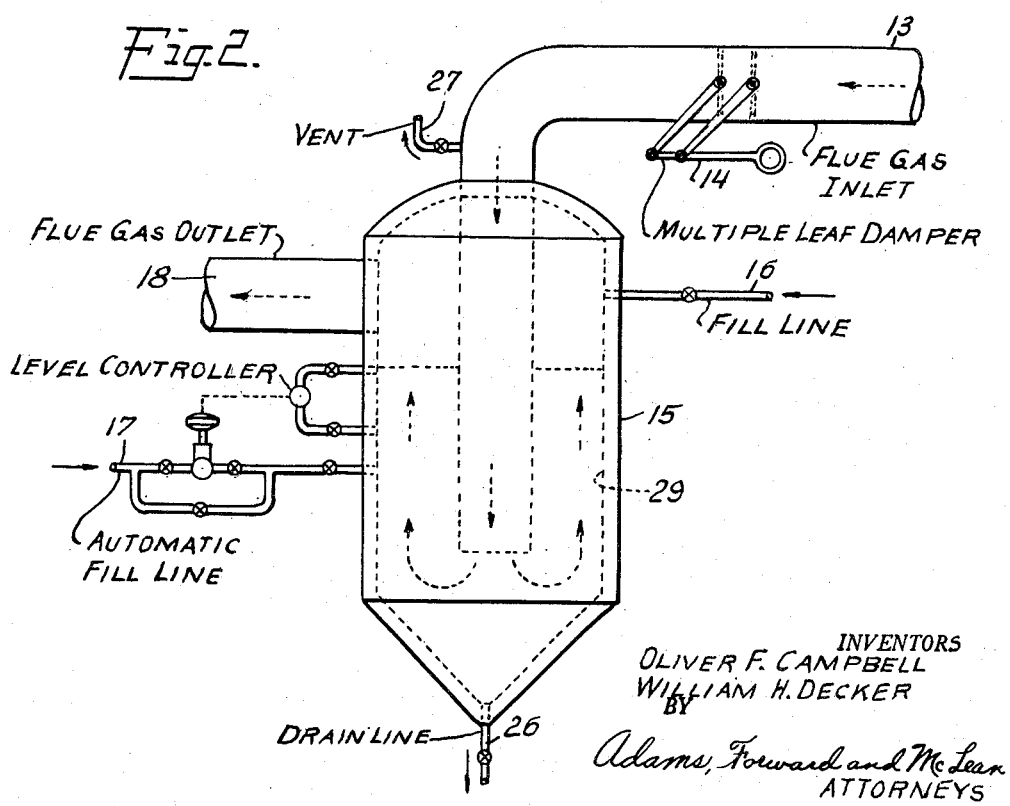

An enlarged view of the sealing arrangement provided in our waste heat recovery system is given in Figure 2 to show further details of its structure and operation. As illustrated in Figure 2, the sealing arrangement is closed to maintain a seal between the regenerator 11 and the waste heat boiler 19 which it normally connects. The broken line arrows in Figure 2 show the direction of flow of the flue gases when the sealing arrangement is in the open position allowing the passage of flue gases from the regenerator 11 to the waste heat boiler 19.

In Figure 2, the flue gas inlet duct 13 connects the sealing arrangement to the regenerator source of flue gases. This duct 13 extends into the water seal vessel 15 to a point such that there is a sufficient vertical distance between the lower end of the duct 13 and the bottom of the flue gas exit duct 18 leading to the waste heat recovery equipment to provide room for a head of water yielding a pressure slightly greater than the expected maximum flue gas pressure to be encountered in the waste heat recovery system. The damper 14 in flue gas inlet duct 13 is shown as a multiple leaf damper although other types of dampers would be suitable. Flue gas inlet duct 13 is provided with a vent 27 which has valve means to open and close it to the atmosphere. The vent 27 is provided to assist in establishing a water seal when the sealing arrangement is employed to block flow of flue gases. In establishing a water seal, after the damper 14 is closed the vent 27 is opened to release to the atmosphere the flue gases leaking by damper 14 during the period when water is being admitted to the water seal vessel 15 to establish the water seal. After the water seal is established in water seal vessel 15, the vent 27 is closed.

The water seal vessel 15 is formed with a cone-shaped bottom so as to provide for easy draining of the water used as the sealing medium and also to prevent accumulation of catalyst dust in the water seal vessel 15. The water seal vessel 15 is lined with a high temperature insulating refractory 29 which will withstand the abrasive effect of the catalyst dust, and the inlet and exit flue gas ducts 13 and 18 are formed of materials suitable for continuous service at 1000° F.

When the sealing arrangement is employed to block the flow of flue gases, water is admitted to water seal vessel 15 to establish the water seal through water inlet or fill lines 16 and 17. Water inlet line 16 is the main fill line used for rapid filling of the water seal vessel 15 when a water seal is being established and water inlet line 17 is the automatic fill line for make-up water to maintain the proper water level, such as is shown by the broken line across the water seal vessel 15 in Figure 2, after the water seal has been established. In conjunction with water inlet line 17, a level controller such as an external float cage level controller and a gauge glass serve to provide automatic maintenance of this proper water level of the water seal so that operator attention is not required. Water is drained from the water seal vessel 15 through drain line 26 to break a water seal. All the water lines 16, 17 and 26 have suitable valve means to control flow through these lines.

In Figure 3 a more detailed illustration of an embodiment of our waste heat recovery system is given, showing more details of the regenerator and the carbon monoxide waste heat boiler equipment and their connection through the sealing arrangement. In the system illustrated in Figure 3, a bed of finely divided catalyst particles to be regenerated by burning off carbonaceous or coke deposits is maintained in a fluidized condition in regenerator 11 above distribution grid 30. Spent catalyst enters the regenerator 11 through spent catalyst riser 31 from the reactor 10 not shown in this figure. Regenerated catalyst is withdrawn from the regenerator 11 through standpipe 32 for recirculation to the reactor. Combustion air for the regeneration process usually is introduced to the regenerator 11 as the carrier medium for transferring catalyst from riser 31 into the bed. Flue gases produced by the regeneration process leave regenerator 11 through cyclone system 33 and flue gas duct 12. Dip leg 34 is provided in connection with cyclone system 33 for returning catalyst fines disengaged thereby to the regenerator bed.

In the normal operation of the system illustrated in Figure 3, the hot flue gases leaving regenerator 11 through flue gas duct 12 pass by vent duct 25 which is closed by a suitable flow control device, and advantageously by a water seal sealing arrangement, and into flue gas duct 13. The flue gases pass the open multiple leaf damper 14 in flue gas duct 13, enter the water seal vessel 15 of the sealing arrangement which is in open flow condition, i. e., the water seal vessel 15 does not contain any water, pass through the water seal vessel 15 and out through flue gas exit duct 18. Flue gas exit duct 18 delivers the hot flue gases to a carbon monoxide waste heat boiler of the type described in our before-mentioned application Serial No. 235,183.

The carbon monoxide burner apparatus illustrated in Figure 3 comprises essentially a muffle tube 35, a conventional gas burner 36, an annular chamber 37, a mixing register 38, and a furnace chamber 39 all situated within steel pipe 40. The muffle tube may consist of a cylindrical tube 6 inches in inside diameter and constructed of Carborundum refractory. The extraneous fuel burner 36 may be any conventional burner susceptible of high rates of heat release and convenient control. By way of example, a 4-inch Maxon Ventite gas burner in which gas is supplied through line 41 and in which air is inspirated at the venturi so that single valve control is provided may be used. The muffle tube 35 serves as a combustion chamber for this extraneous fuel. Annular chamber 37 is an annular chamber surrounding the muffle tube 35, and the outside wall of this annular chamber may be lined with plastic refractory to reduce heat losses. The mixing register 38 may be a circular vane wheel provided with small vanes at the periphery. The furnace chamber 39 located above the mixing register 38 may be lined with plastic refractory to reduce heat losses. The steel pipe 40 may be for example, a 20-inch diameter steel pipe.

The carbon monoxide containing flue gases delivered to the carbon monoxide burner apparatus by flue gas exit duct 18 from the water seal vessel 15 of the sealing arrangement are introduced tangentially at the bottom of the annular zone or plenum chamber 37. Excess air may be supplied by means of line 42. The purpose of the annular or plenum chamber 37 is to provide preheat to the incoming flue gases and the introduction of the flue gases is tangential so as to impart the maximum rotary motion to these gases to increase their residence time in the annular chamber 37. The preheated flue gases then pass through mixing register 38. The small vanes at the periphery of the mixing register are set at such an angle as to impart a high velocity circular motion to the flue gases leaving the annular chamber 37 and passing into the high temperature combustion gases leaving the muffle tube 35. The thoroughly admixed flue gases and combustion gases then pass into furnace zone 39 where the carbon monoxide ignites spontaneously and is completely burned. In operating our waste heat recovery system illustrated in Figure 3 the total carbon monoxide free flue gases leave combustion chamber 39 and are passed through conduit 43 to the tubes of waste heat boiler 44. The waste heat boiler may be designed in the usual manner with suitable capacity to recover any desired amount of heat from the combustion gases. An exit temperature of the order of about 700° F., for example, may be satisfactory. If a water tube waste heat unit is employed, advantageously the tubes should be provided with fittings or gill rings to increase heat transfer efficiency and thereby reduce the number of the tubes required. Boiler feed water may be supplied from overhead drum 45. The cooled gas stream may be then passed through conduit 46 to a second heat recovery unit 47. Advantageously heat recovery unit 47 serves as a boiler feed water economizer through which treated boiler feed water supplied through line 48 is passed before admission to boiler feed drum 45. High temperature steam is withdrawn from the boiler feed drum 45 through line 49, for such use as is desired. The cooled carbon monoxide free flue gases and combustion gases are vented to the atmosphere through line 50.

In the embodiment of our waste heat recovery system illustrated in Figure 3, the operation of the sealing arrangement to establish a water seal in water seal vessel 15 in order to isolate the carbon monoxide waste heat boiler equipment from the regenerator flue gases is the same as that previously described.

Our waste heat recovery system provides a reliable method for by-passing flue gases around waste heat recovery equipment so that in the event of a breakdown of this equipment, the equipment can be quickly removed from service, isolated from the source of carbon monoxide-containing flue gases to insure safe working conditions for the necessary repairs, and returned to service without it being necessary to have an unscheduled and therefore very costly shut down or curtailment of the operation of the whole fluid catalytic cracking unit. For this reason, our system has particular value when it is adapted to new equipment, such as the carbon monoxide waste heat boiler, which will encounter operating problems not foreseen in the design stage of development that may necessitate its removal from operation for adjustment, repairs or maintenance.

We claim:

1. A waste heat recovery system which comprises a generating source of flue gases, a waste heat boiler, a sealing arrangement, connecting ducts joining the sealing arrangement with the generating source and with the waste heat boiler, a vent duct connected to the connecting duct on the upstream side of the sealing arrangement provided with means to open and close the vent duct to the passage of the stream of flue gases; in which the sealing arrangement comprises a damper located in the duct connecting the generating source and the sealing arrangement and a water seal vessel located on the downstream side of the damper, the water seal vessel comprising a closed vessel down into which the connecting duct from the generating source of the flue gases extends and out of which near its top extends the duct connecting the sealing arrangement to the waste heat boiler, an inlet line for admitting water to the closed vessel and a drain line for discharging water from the closed vessel with valve means in each of the inlet and drain lines to control the rate of the flow through these lines.

2. A waste heat recovery system which comprises a regenerator of a fluid catalytic cracking unit as a generating source of flue gases, a carbon monoxide waste heat boiler comprising a burner means for burning the carbon monoxide content of the flue gases and a boiler system, a sealing arrangement, connecting ducts joining the sealing arrangement with the regenerator and with the carbon monoxide waste heat boiler, and a vent duct connected to the connecting duct on the upstream side of the sealing arrangement provided with means to open and close the vent duct to the passage of the stream of flue gases; in which the sealing arrangement comprises a damper located in the duct connecting the regenerator and the sealing arrangement and a water seal vessel located on the downstream side of the damper, the water seal vessel comprising a closed vessel down into which the connecting duct from the regenerator extends and out of which near its top extends the duct connecting the sealing arrangement to the carbon monoxide waste heat boiler, an inlet line for admitting water to the closed vessel and a drain line for discharging water from the closed vessel with valve means in each of the inlet and drain lines to control the rate of the flow through these lines.

3. A waste heat recovery system which comprises a regenerator of a fluid catalytic cracking unit as a generating source of flue gases, a carbon monoxide waste heat boiler comprising a burner means for burning the carbon monoxide content of the flue gases and a boiler system, first and second sealing arrangements, connecting ducts joining said first sealing arrangement with the regenerator and with the carbon monoxide waste heat boiler, and a vent duct connected to the connecting duct on the upstream side of the first sealing arrangement, said second sealing arrangement located in the vent duct; in which the first sealing arrangement comprises a damper located in the duct connecting the regenerator and the first sealing arrangement and a water seal vessel located on the downstream side of the damper, the water seal vessel comprising a closed vessel down into which the connecting duct from the regenerator extends and out of which near its top extends the duct connecting the first sealing arrangement to the carbon monoxide waste heat boiler, an inlet line for admitting water to the closed vessel and a drain line for discharging water from the closed vessel with valve means in each of the inlet and drain lines to control the rate of flow through these lines, and in which the second sealing arrangement comprises a damper located in the vent duct and a water seal vessel located in the vent duct on the downstream side of the damper, the water seal vessel comprising a closed vessel down into which the vent duct extends and out of which near its top an outlet vent duct extends, an inlet line for admitting water to the closed vessel and a drain line for discharging water from the closed vessel with valve means in each of the inlet and drain lines to control the rate of the flow through these lines.

4. A waste heat recovery system which comprises a regenerator of a fluid catalytic cracking unit as a generating source of flue gases, a carbon monoxide waste heat boiler comprising a burner means for burning the carbon monoxide content of the flue gases and a boiler system, first and second sealing arrangements, connecting ducts joining said first sealing arrangement with the regenerator and with the carbon monoxide waste heat boiler, and a vent duct connected to the connecting duct on the upstream side of the first sealing arrangement, said second sealing arrangement located in the vent duct; in which the first sealing arrangement comprises a damper located in the duct connecting the regenerator and the first sealing arrangement, a water seal vessel located on the downstream side of the damper, and a vent with means to open and close it to the atmosphere located in the connecting duct between the damper and the water seal vessel, the water seal vessel comprising a closed vessel down into which the connecting duct from the regenerator extends and out of which near its top extends the duct connecting the first sealing arrangement to the carbon monoxide waste heat boiler, an inlet line for admitting water to the closed vessel and a drain line for discharging water from the closed vessel with valve means in each of the inlet and drain lines to control the rate of flow through these lines, and in which the second sealing arrangement comprises a damper located in the vent duct, a water seal vessel located in the vent duct on the downstream side of the damper, and a vent with means to open and close it to the atmosphere located in the vent duct between the damper and the water seal vessel, the water seal vessel comprising a closed vessel down into which the vent duct extends and out of which near its top an outlet vent duct extends, an inlet line for admitting water to the closed vessel and a drain line for discharging water from the closed vessel with valve means in each of the inlet and drain lines to control the rate of the flow through these lines.

5. A waste heat recovery system which comprises a regenerator of a catalytic conversion unit as a generating source of flue gases containing carbon monoxide, a carbon monoxide waste heat boiler comprising a burner means for burning the carbon monoxide content of flue gases from the regenerator and a boiler system for recovering heating values, a water seal means comprising a closed vessel, a connecting duct joining said regenerator and water seal and provided with a vent duct, means in said vent duct to open and close the vent duct to the passage of flue gases, a duct connecting said water seal and said carbon monoxide waste heat boiler, valved water supply means to said water seal means to supply water to said water seal means and permit establishing a water level therein, and valved draining means from said water seal means to permit draining of said seal means.

References Cited in the file of this patent

UNITED STATES PATENTS

| | | |
|---|---|---|
| 1,560,063 | Kucera | Nov. 3, 1925 |
| 2,065,850 | Black et al. | Dec. 29, 1936 |
| 2,336,833 | Badenhausen | Dec. 14, 1943 |